United States Patent
Evans

(10) Patent No.: US 12,147,789 B2
(45) Date of Patent: *Nov. 19, 2024

(54) SYSTEM AND METHOD FOR MANAGING AND USING DATA MODEL

(71) Applicant: JUMBO INC., San Francisco, CA (US)

(72) Inventor: Aaron Evans, San Francisco, CA (US)

(73) Assignee: JUMBO INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,092

(22) Filed: Mar. 16, 2023

(65) Prior Publication Data

US 2023/0367560 A1 Nov. 16, 2023

Related U.S. Application Data

(63) Continuation of application No. 15/014,721, filed on Feb. 3, 2016, now Pat. No. 11,630,645, which is a continuation-in-part of application No. 14/853,288, filed on Sep. 14, 2015, now abandoned.

(60) Provisional application No. 62/125,951, filed on Feb. 4, 2015, provisional application No. 62/071,041, filed on Sep. 13, 2014.

(51) Int. Cl.
*G06F 16/21* (2019.01)
*G06F 8/35* (2018.01)

(52) U.S. Cl.
CPC .............. *G06F 8/35* (2013.01); *G06F 16/212* (2019.01)

(58) Field of Classification Search
CPC .......... G06F 8/437; G06F 8/35; G06F 16/954; G06F 16/23; G06F 16/211; G06F 16/212; G06F 67/02

See application file for complete search history.

(56) References Cited

U.S. PATENT DOCUMENTS

| | | | | |
|---|---|---|---|---|
| 7,702,719 | B1* | 4/2010 | Betz | H04L 67/02 709/201 |
| 7,953,767 | B2* | 5/2011 | Shaburov | G06F 8/34 707/805 |
| 9,659,040 | B1* | 5/2017 | Bellingan | G06F 16/213 |
| 11,630,645 | B2 | 4/2023 | Evans | |
| 2002/0169745 | A1* | 11/2002 | Hotti | G06F 16/211 |
| 2003/0041180 | A1* | 2/2003 | Schlussman | G06F 8/30 719/328 |
| 2005/0175015 | A1* | 8/2005 | Ramaswamy | G06F 16/954 370/395.52 |
| 2006/0161558 | A1* | 7/2006 | Tamma | G06F 11/0709 |
| 2007/0256060 | A1* | 11/2007 | Ryu | G06F 8/437 717/140 |
| 2008/0005719 | A1* | 1/2008 | Morris | G06F 8/41 717/100 |
| 2008/0016122 | A1* | 1/2008 | Liu | G06F 16/8365 |
| 2009/0172569 | A1* | 7/2009 | Arthursson | H04L 67/01 718/1 |

(Continued)

*Primary Examiner* — Hosain T Alam
*Assistant Examiner* — Robert F May
(74) *Attorney, Agent, or Firm* — Fishman Stewart PLLC; Cecily Anne O'Regan

(57) ABSTRACT

Disclosed is a system and method for defining data structures for client-server system. In one embodiment, the present invention provides a compiler-enforced data model across distributed systems for providing system stability and the ability to identify and fix violations of the data model contract in a more efficient manner.

24 Claims, 5 Drawing Sheets

(56) References Cited

U.S. PATENT DOCUMENTS

| | | | | |
|---|---|---|---|---|
| 2010/0162211 A1* | 6/2010 | Ostrovsky | ............... | G06F 8/437 |
| | | | | 717/114 |
| 2011/0040657 A1* | 2/2011 | Roswell | ................ | G06F 16/958 |
| | | | | 707/E17.046 |
| 2011/0246535 A1* | 10/2011 | Freeman | ............. | G06F 16/9038 |
| | | | | 707/E17.044 |
| 2012/0101800 A1* | 4/2012 | Miao | ................... | G06F 11/3692 |
| | | | | 703/22 |
| 2014/0280771 A1* | 9/2014 | Bosworth | ............... | H04L 67/10 |
| | | | | 709/219 |
| 2014/0365436 A1* | 12/2014 | Calienes | ............. | H04L 67/1095 |
| | | | | 707/620 |
| 2015/0095283 A1* | 4/2015 | Kristoffersen | ..... | G06K 19/0723 |
| | | | | 707/624 |
| 2016/0042022 A1* | 2/2016 | Sato | ........................ | G06F 16/23 |
| | | | | 707/741 |

* cited by examiner

SYSTEM AND METHOD FOR MANAGING AND USING DATA MODEL

CROSS-REFERENCE TO RELATED APPLICATIONS

This application is a continuation of U.S. patent application Ser. No. 15/014,721 filed Feb. 3, 2016, now U.S. Pat. No. 11,630,645 issued Apr. 18, 2023, which is a continuation-in-part of U.S. patent application Ser. No. 14/853,288, filed Sep. 14, 2015, which claims the benefit of U.S. Provisional Patent Application No. 62/071,041, filed Sep. 13, 2014, and U.S. Provisional Patent Application No. 62/125,951, filed Feb. 4, 2015, which applications are hereby incorporated by reference in their entirety.

FIELD OF THE INVENTION

The present invention generally relates to a software development tool and services for client and server applications. More particularly, the present invention is directed to a system and method for managing and using a data model for a distributed application such as a server application, a mobile client application, a web application, and the like.

BACKGROUND OF THE INVENTION

Updating and managing a data model is a constant challenge for many software developers as any change in the data model of a distributed application impacts many parts of the distributed application. For example, a single change to a data structure, no matter how simple or minor, affects multiple components in a system such as a data storage, a data binding module, a model, and an Application Programming Interface (API) of one or more distributed applications as well as data packet structures.

Currently, there exists no convenient methodology for software developers to design and deliver structured client-server data. This can be especially problematic for many mobile application developers as mobile applications are exponentially growing in popularity and use, yet many web services for mobile phone consumption comprises weakly typed data.

The data structures of the existing systems in particular are not well defined, and therefore it is difficult to maintain code across distributed systems that are dependent upon them, or effectively monitor and produce usage statistics against them. Thus, changes to data structures can create a substantial impact across heterogeneous systems with a plurality of heterogeneous distributed applications. In this regard, there is a need in the prior art for an improved means to design and deliver structured client-server data.

Some systems utilize JavaScript object notation (JSON) or similar data-exchange format that is based upon a scripted language. While JSON is a good delivery mechanism for mobile because of its compact format, it is limited in that it is not typesafe and that it does not adequately define a data model. Moreover, there is no truly practical way to define and enforce a data model construct or contract because developers cannot modify a data model in a compiler-verified manner, particularly for distributed systems such as mobile client-server applications.

The present invention overcomes the foregoing limitations by disclosing a system and method that allows software developers to readily design distributed data models. In this regard, the invention not only enhances the overall system stability and flexibility, but also improves on the ability to track usage of the data. This in-turn allows various stakeholders to better view or audit system and data usage claims.

SUMMARY OF THE INVENTION

In view of the disadvantages inherent in the known types of systems for creating and using data models now present in the prior art, the present invention provides an improved system and method for defining data structures for a client-server system in an efficient manner.

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as to prelude to the more detailed description that is disclosed later.

In a preferred embodiment, the present invention provides a compiler-enforced data model across distributed systems. This helps improve system stability and provides the ability to identify and fix violations of the data model contract in a more predictable and manageable manner. In this regard, the present invention enables users to deliver data in the popular JSON as well as XML formats.

It is therefore an object of the present invention to resolve development challenges of heterogeneous mobile devices running on Android (Java), iOS (Objective-C), and other mobile devices, e.g., Chrome.

It is another object of the present invention to allow software developers to readily design distributed data models, whereby allowing the developers to design the data models enhances the overall system stability and flexibility, and improves on the ability to track usage of the data.

It is still another object of the present invention to provide a system that comprises a data model that is orthogonal to the view and controller to minimize the amount of code changes when required.

It is still another object of the present invention to define a master schema that defines data structures for the entire client-server system and that uses compilers to confirm that the data structures conform to the schema.

It is still another object of the present invention to dramatically reduce the time it takes to write, test, and troubleshoot source code in a distributed system.

It is still another object of the present invention to simplify the impact of updating source code by the use of schemas and source code generators to automatically re-generate or modify the source code related to distributed applications.

It is still another object of the present invention to report and identify issues and their locations within the code base as necessary.

In the light of the foregoing, these and other objects are accomplished in accordance of the principles of the present invention, wherein the novelty of the present invention will become apparent from the following detailed description and appended claims.

BRIEF DESCRIPTION OF THE DRAWINGS

The above and other objects and advantages of the present invention will be apparent upon consideration of the following detailed description, taken in conjunction with the accompanying exemplary drawings, in which like reference characters refer to like parts throughout, and in which.

DETAILED DESCRIPTION OF THE INVENTION

The present invention is directed towards a system and method for managing and using data models. For purposes of clarity, and not by way of limitation, illustrative views of the present system and method are described with references made to the above-identified figures. Various modifications obvious to one skilled in the art are deemed to be within the spirit and scope of the present invention.

As used in this application, the terms "component," "module," "system," "interface," or the like are generally intended to refer to a computer-related entity, either hardware or a combination of hardware and software. For example, a component can be, but is not limited to being, a process running on a processor, an object, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or." Additionally, the articles "a" and "an" as used in this application and the appended claims should generally be construed to mean "one or more" unless specified otherwise or clear from context to be directed to a singular form. It is to be appreciated that determinations or inferences referenced throughout the subject specification can be practiced through the use of artificial intelligence techniques.

Figure 1:
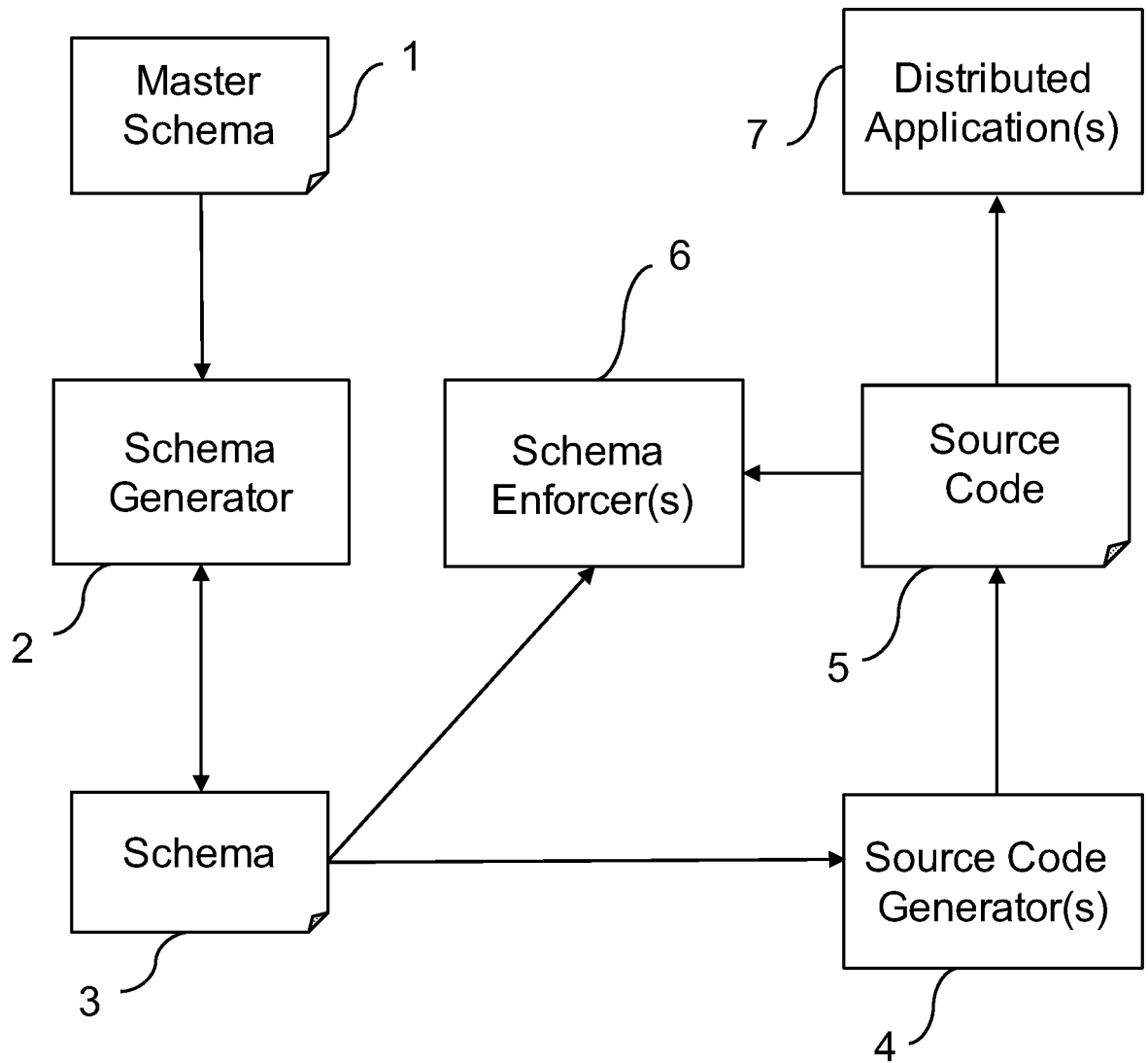
FIG. 1 is an exemplary embodiment of the present invention.

Referring now to FIG. 1, there is shown an exemplary block diagram of the present invention. The present invention comprises a computer system within which it comprises a computer program or a component software, hereinafter referred to as the Schema Generator 2 that reads a Master Schema 1 describing the data model of one or more distributed applications to generate one or more Schemas 3. In a preferred embodiment, the Master Schema 1 is defined as an XSD file.

The Master Schema 1 can be derived from multiple sources, in whole or in part using an automated and/or a manual process. In one embodiment of the present invention, the Master Schema 1 can be derived from structured data such as a JSON payload or SQL data table structures, in whole or in part. In another embodiment, part of all of the Master Schema 1 can also be derived from the source code of enterprise applications or client applications, or from the annotations to source code of the enterprise or client applications, e.g., JAXB or JPA annotations. In still another embodiment, part of all of the Master Schema 1 may be derived by an API's discovery or introspection facilities, e.g., the Web Services Description Language (WSDL), payload of a Simple Object Access Protocol (SOAP) interface, etc.

The present invention further comprises one or more Source Code Generators 4. The Source Code Generator 4 comprises a computer programs or component such as Integrated Development Environment (IDE) that generates data objects and views. The Source Code Generator 4 reads one or more Schemas 3, and that generates a Source Code 5 consistent with a schema or a system model. More specifically, the Source Code Generator 4 generates the Source Code 5. In some embodiments, the Source Code 5 may be part of a SDK. Non-limiting examples of Source Code 5 includes: Java Architecture for XML Binding (JAXB) markup, annotations, and configuration files, Hibernate or JPA markup, annotations and configuration files, serializers that are capable of generating structured data packets, and API introspection facilities, e.g., Web Services Description Language (WSDL) among others.

In an alternate embodiment, Source Code Generators 4 may consume the Master Schema 1, wherein the Master Schema 1 contains annotations or similarly functioning identifiers, which the Source Code Generator 4 may use to identify the relevant portions of the Master Schema 1 for the purposes of generating or modifying source code.

The present invention further comprises one or more Schema Enforcers 6, wherein the Schema Enforcers 6 comprise one or more computer programs or components that can act as a source code compiler such as a Java compiler or an iOS compiler, and compiles or links the Schema 3 as part of the building process to create the Distributed Application 7. Alternatively, Schema Enforcers 6 comprise virtual machines (VMs), interpreters, and the like. Moreover, a single schema file can be leveraged to define default behavior by creating various artifacts to create a basis for an operable running enterprise system that also includes mobile apps. The model compiler mechanism plus marshallers and parsers are operable to expose the data model in a typesafe manner higher-up on the communication stack to prevent type errors which is especially useful for developers of mobile apps. Once all setup is complete, a user can edit the schema to indirectly modify the model files. By modifying the schema, and then re-generating the model files, the user is creating a contract to which the systems must conform. This essentially opens "switches" available to the applications in terms of what types of data and structures of data the applications are able to read or write.

In an alternate embodiment, the Schema Enforcer 6 compiles or links the Master Schema 1, wherein the Master Schema 1 contains annotations relevant to the Schema Enforcer 6. For example, annotations may indicate that a portion of the Master Schema 1 is relevant to the database binding, e.g., @db, @hql, @sql, etc., relevant to the client only, e.g., @client, relevant to its data objects, e.g., @client-do, relevant to server data objects, e.g., @server-do, relevant to application programming interfaces, e.g., @ api, and so forth. The Distributed Application 7 may be a component of a larger distributed system such as a server application, a mobile client application, a web application, etc.

One or more Schemas 3 may be derived from the Master Schema 1 via a Schema Generator 2. One or more Source Code Generators 4 may read one or more Schemas 3 and generate Source Code 5 on behalf of software developers. Source code generation may include, but is not limited to generating database schemas, database queries or stored procedures, class files for generating objects such as Plain Old Java Objects (POJOs), Android or iOS data objects, Android or iOS user interface objects, serializers, parsers, transport schemas, and APIs. Once generated, the Source Code 5 is linked or compiled into one or more Distributed Applications 7. Alternatively, the Source Code 5 may be compiled into classes, and then directly injected e.g., via Java, into the Distributed Application 7.

In some embodiments, the Schema Generator 2 may not actually generate, but mark-up the Master Schema 1 instead. By marking-up the Master Schema 1, Schema Generator 2 does not create a separate Schema 3, but can create a virtual Schema 3 or identify Schema 3 contained within the Master Schema 1. In this regard, the Schema Generator 2 is configured to map schema and/or validate. More specifically, the Schema Generator 2 can validate that Schemas 3 conform to the Master Schema 1. In other embodiments, the Schema Generator 2 generates Schemas 3 by one or more of the following several mechanisms: by creating and modifying copies of Master Schema 1 and its elements; by defining element instances; and by marking-up the Master Schema 1 or similar mechanisms.

The Schema Generator 2 may contain a GUI editor that allows users to graphically create and edit groups of elements such as element containers that may contain re-usable sets of the schema elements. Accordingly, each Schema 3 comprises an associated and/or correlating group of elements for producing the same. In this way, the Schema 3 is a perspective that maps or binds a client application to a server application, or a client to a server. Moreover, this "perspective" can be that of a client app's component or module.

Another benefit of the present mechanism is that the Schema Generator 2 creates and then allows editing of the Schema 3, which is now part of the software building process. This means the GUI designs are now part of the software development process, instead of throw-away models as existed in the past. These perspectives correlate to pieces of re-usable functionality for one or more client applications; wherein the client applications model the state of the distributed system via data structures that map and directly correlate to backend data structures. The GUI edits produce perspectives that represents reusable client components and that conforms to the Master Schema 1. Thus, the perspectives can map the structures to the backend (which may contain unwieldy RDBS structures) and serve as the initial components. The initial components can be built as actual component of a mobile app workflow or user stories. In this regard, the server behavior can often be completely defined by sets of perspectives that can be presented as documents within the GUI. This is a practical benefit in that it minimizes or virtually eliminates the amount of server coding required. Defining these perspectives or subsets in this manner has the additional benefits of enabling mapping of a non-normalized client model to the Master Schema 1 (which may be normalized), and inherent enhanced security and (query) performance benefits.

Accordingly, the Distributed Application 7 contains the Source Code 5 that can either be manually written or generated along with binaries and other classes. The Distributed Application 7 may comprise: JAXB source code, object code, or binaries, which is capable of generating Java objects from XML (or JSON) and XML (or JSON) from Java objects of classes; and Hibernate or JPA binaries, source code, or object code, which is capable of generating SQL scripts and stored procedures from Hibernate markup, annotations, and configuration files. In this regard, the Distributed Application 7 is configured to read the markups generated in the Source Code 5.

In one embodiment, the Master Schema 1 and/or the Schemas 3 may contain annotations or other suitable identifiers and identifying means, which address runtime behavior. In this regard, the Source Code Generator 4 can read the annotations and can generate a Schema 3 that may contain artifacts representing the annotations. For example, annotations may restrict the Source Code 5 or identify a design pattern or behavior for addressing more challenging operations, such as serializing or deserializing nested complex data structures or objects, e.g., @custom, @restrict, @no-serialize, etc. For example, an annotation, e.g., @dirty, @delta, @change-only, might indicate to the Source Code 5 such that it identifies the ID of an object or data structure whose contents have changed, the object having a parent object and multiple child objects, the Source Code 5 serializing only the object that changed from the Distributed Application 7, and deserializing the object on the corresponding client or server's Distributed Application 7. Also, @specialized or similar annotation could indicate that an element does not conform to the Master Schema 1. In some embodiments, various texts can be attached or associated to a particular set of elements in Schema 3 to customize server-side behavior using @custom or other similar mechanisms.

The present invention allows software developers to create their own Source Code 5, whereby the Schema Enforcer 6 ensures that the Source Code 5 complies with the requirements of the Schema(s) 3. The Source Code 5 may be any program language such as C, C++, C #, Java, Scala, JavaScript, Pascal, Fortran, Perl, Matlab, SAS, SPSS, AJAX, or Objective-C, among others. An ordinary person skilled in the art will appreciate that Source Code 5 may consist of database schemas, database queries and stored procedures, server classes and their object instances, APIs, serializers, transport layer schemas, and parsers and server side classes and their object instances, among other components.

One advantage of using code generation in conjunction with code enforcement is that minor changes such as adding a single attribute that necessarily changes database code, e.g., schemas, database queries, stored procedures or other data bindings, class structure, API, transport layer, client side classes, and UI classes, etc. can be generated from one or more Schemas 3 and Source Code Generators 4.

The Schema Enforcers 6, distributed throughout the system, can ensure that the Source Code 5 generated via the Source Code Generators 4 and/or modified Source Code 5 are compliant with the Schema(s) 3. One benefit of this embodiment is that changes that propagate throughout a distributed system can be iterated rapidly. Another benefit of this embodiment is that it can generate source code without utilizing costly resources.

Without limitation, Distributed Applications 7 may comprise server-based applications, client-based applications, and/or other applications, wherein the applications are operated via various computer systems. The Source Code 5 may be created via Schema 3 and Source Code Generators 4 to serve client, server, or other distributed application purposes such as network communications.

Figure 2:
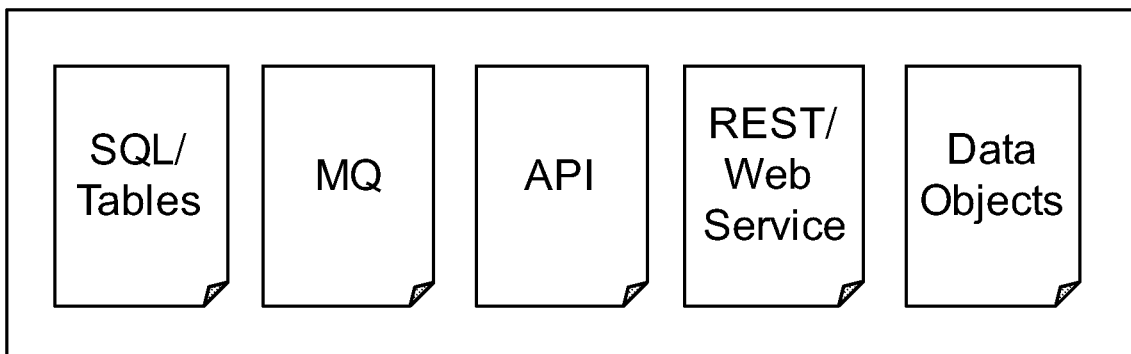
FIG. 2 is a detailed view of the master schema, the schema generator, and schemas of the present invention.
Figure 2:
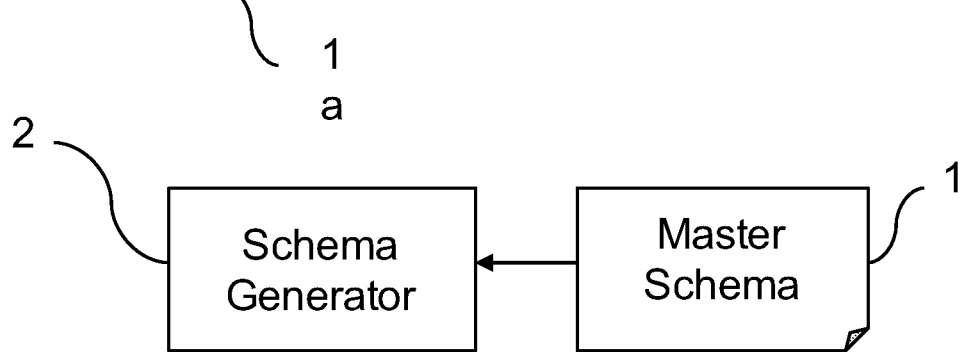
Figure 2:
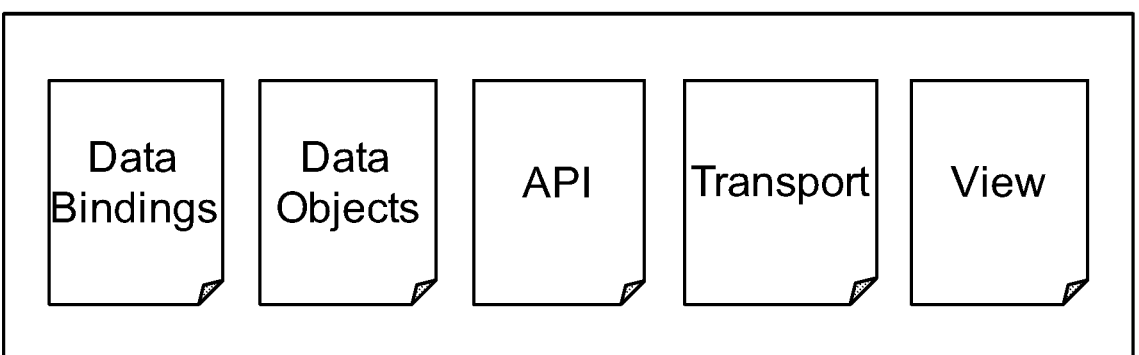

Referring now to FIG. 2, a Master Schema 1 may be created manually, or it may be derived from one or more Data Sources 1a, which comprises SQL table dictionaries, Message Queues (MQs), APIs, REST or Web Service interfaces, data object or class source code, and other structured data sources.

In still another embodiment, part or all of the Master Schema 1 is derived from data objects, data bindings and/or data storages. In still yet another embodiment, part of all of the Master Schema 1 is derived from the API(s) of the enterprise application(s). Deriving a Master Schema 1 from data objects, data bindings and/or data storages captures data structures. Deriving a Master Schema 1 from APIs may capture both data structures and application behavior.

A Schema Generator 2 may generate multiple schemas capable of working with a plurality of heterogeneous components. Schemas 3a may include data bindings such as: SQL scripts or stored procedures and data bindings for tools such as Hibernate or Enterprise Java Beans (EJBs); data object or class source code; APIs, a Transport layer for transporting data between data objects on a server and data objects on one or more clients; and bindings between data objects and views such as graphic user interface (GUI) components, e.g., panels, combo boxes, lists, dialog boxes, grids, buttons, etc.

Figure 3:
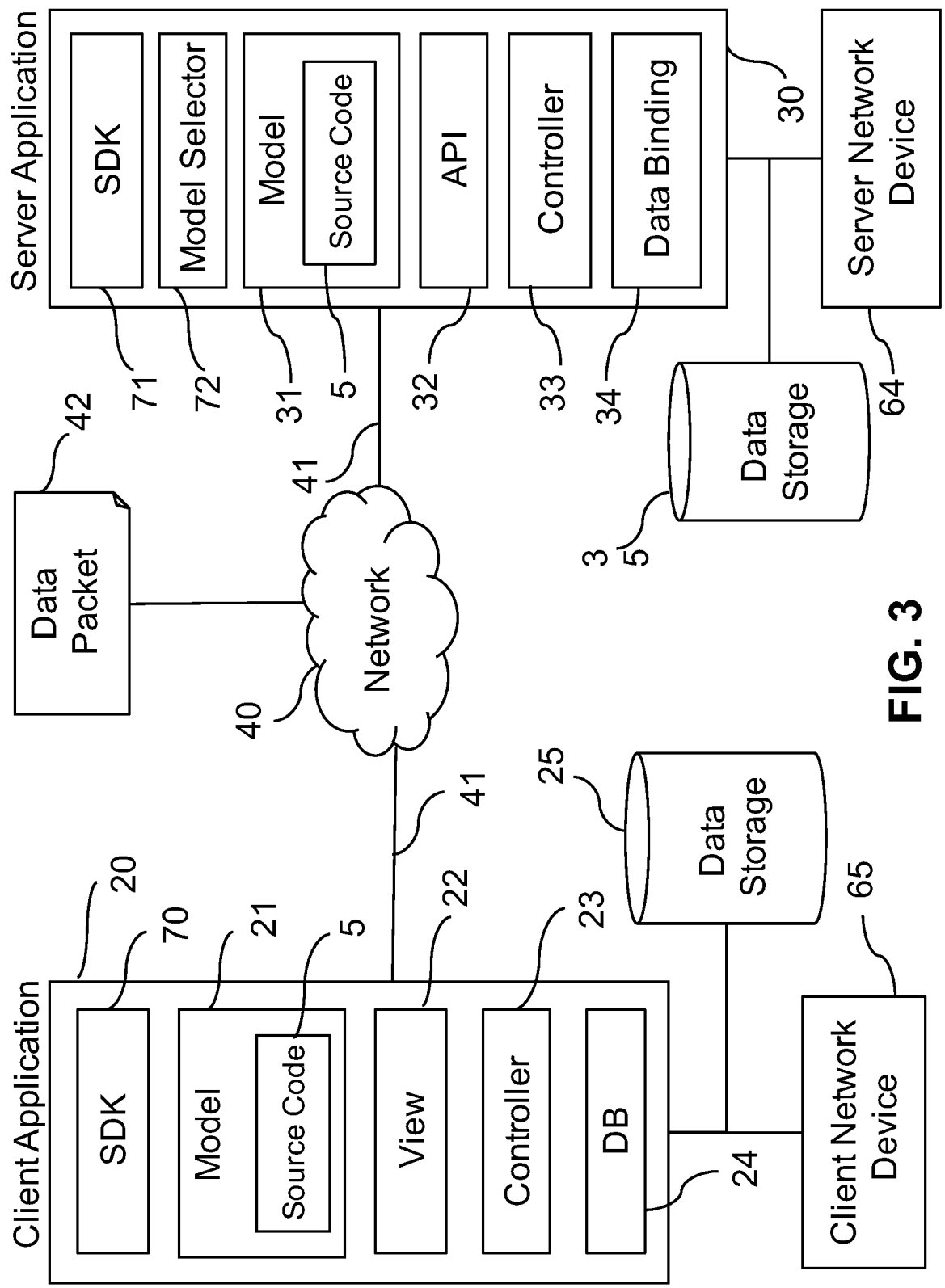
FIG. 3 shows an exemplary embodiment of the present system.

Referring to FIG. 3, a distributed application may be a Server Application 30 or a Client Application 20, wherein each of the Server Application 30 and the Client Application 20 is operable on a computer system such as a personal computer, a tablet computer, a laptop, a personal digital assistant, a mobile phone, a web appliance, and the like. For the purposes of clarity, it is noted that the Client Application 20 is operated via at least one client network device 65 and the Server Application 30 is operated via at least one server network device 64. While it is an object of the present invention to resolve development challenges of heterogeneous mobile devices running on Android (Java), iOS (Objective-C), and other mobile devices, e.g., Chrome, it is within the spirit of the present invention that a Client Application 20 may also be a web application or a GUI application among other possible embodiments by providing a common data model. In the illustrated embodiment, the distributed client applications 20 and server application 30 depict a common Model-View-Control (MVC) architecture. It is contemplated, however, that the present invention may also facilitate other architectures or design patterns in addition to MVC, depending upon embodiment.

The Server Application 30 comprises at least one of a Data Model 31, an API 32, a Controller 33, a SDK 71, and at least one Data Binding (DB) module 34. The API 32 may be derived from the Data Model 31, which contains Source Code 5, its binary form, or its functional equivalent. Similarly, the Client Application 20 comprises at least one of a Data Model 21 having Source Code 5, a View 22, a Controller 23, a DB module 24, and a SDK 70. The Data Model 21 is substantially orthogonal to the View 22 and the Controller 23 such that the present system comprises a substantially orthogonal model and requires the minimal amount of code changes. Additionally, each of the Server Application 30 and the Client Application 20 may comprise Data Storage 25, 35. The Data Storage 25 of a Client Application 20 and the Data Storage 35 of the Server Application 30 may be any type of storage such as an SQL database, an object store, and unstructured data storage system, e.g., MongoDB, or a cache among other possible storage types.

In one embodiment, the Schema 3 is validated against the Master Schema 1 (as depicted in FIG. 1), which represents the server domain. Conversely, the Data Model 21 is generated in the form of Source Code 5. In this way, the client Data Model 21 is guaranteed to map to the server Data Model 31. This effectively makes the client Model 21 a virtual server Data Model 31. This virtualization mechanism essentially exposes the server Data Model 31 further up on the technology stack, which greatly streamlines client-server development—all while allowing coders to develop natively, and use a designer-friendly GUI for complex system model modifications.

In the illustrated embodiment, the Data Model 31 provides a particular perspective or view into the Data Storage 35 via Data Bindings DB Model 34. On the Client Application 20, the Data Model 21 is a client-compatible (client programming-language-compatible) copy of the Data Model 31 such that the client and the server are conceptually bound together by a common model. As a result, the capability for the server (on which the client depends on and interfaces with) can be fully encapsulated by client classes.

In an embodiment where a client network request can be mapped to a particular Schema 3, the present invention optionally comprises a Model Selector 72. The Model Selector 72 can indirectly act as a schema identifier or use a client application identifier to identify an application version number, a client identifier, a similar GUID, runtime parameters, or a combination thereof. The Model Selector 72 picks the appropriate server Data Model 31 at run-time to service the client's networked data requests based upon these identifiers. The Model Selector 72 can be configured on either side of the API, depending upon embodiment. In this regard, if the Model Selector 72 is located between the Network 40 and the API 32, it would implicitly select one of several APIs associated with a particular model. This mechanism can be configured via a GUI console of the present invention or manually. Users can also use a GUI to conveniently do the design work in a graphical, re-useable, and simplified manner.

In one embodiment, the Data Storage 25 of a Client Application 20 facilitates a two-phase commit where changes to data are saved locally on the Client Application 20 in the Data Storage 25. The Client Application 20 pushes changes to the Server Application 30, the two-phase commit facilitating "store and forward" operations and providing a means of "walking forward" when a change occurs while the Client Application 20 is not connected to a network, or has an unreliable, network connection. In another embodiment, the Data Storage 25 is not required.

Each of the Client Application 20 and the Server Application 30 is configured to establish a Network Connection 41. In this way, the Server Application 30 and the Client Application 20 are connected to a Network 40 and can exchange data with Data Packets 42 over a packet switched network. Non-limiting examples of communication networks include Ethernet, USB, Firewire, a cellular network, a local area network (LAN), a wide area network (WAN), the Internet, Plain Old Telephone Service (POTS) networks, Bluetooth, WiMAX, WiFi, or a combination of such networks.

Currently, when a developer needs to change the data model of a distributed application, the change often impacts many parts of the distributed application. For example, a simple change such as adding "Address Line 2" to a data structure for a mailing address would necessarily affect the Data Storage 35, the DB module 34, the Data Model 31 and the API 32 of the Server Application 30. The change may also affect the structure of Data Packets 42, and the serializers that write them and the parsers that read them. Similarly, the change would affect the Client Application 20 by requiring changes to its DB module 24, Data Model 21, and View 22. In heterogeneous systems with a plurality of heterogeneous Client Applications, e.g., Android devices, iOS devices, web servers, etc., such a small change has a fairly substantial impact on the overall code base.

In operation, a developer may make a change to the Master Schema 1, regenerate the Schema(s) 3 using the Schema Generator 2, and provide the Schema 3 to the Schema Enforcer 6, wherein the Schema Enforcer 6 is a source code compiler. Alternatively, the Master Schema 1, containing annotations, may be directly provided to the Schema Enforcer 6. The developer may then modify the Source Code 5, and use the Schema Enforcer 6 to ensure that the changes made to the Source Code 5 are compliant.

An ordinary person skilled in the art will appreciate that the changes to the Source Code 5 may impact the Data Storage 35, DB module 34, Data Model 31 and API 32 of the Server Application 30. Such a change would also impact the DB module 24, Data Model 21, and View 22 of each Client Application 20. The ability of the Schema Enforcer 6 to provide useful reporting to ensure that the Source Code 5 is in compliance with the Schema 3 can dramatically reduce the time it takes to write, test, and troubleshoot the Source Code 5 in a distributed system.

In another embodiment of the present invention, the impact to the Source Code 5 in a scenario such as adding "Address Line 2" to a data structure for a mailing address can be radically simplified by the use of Schemas 3 and Source Code Generators 4. More specifically, the Source Code Generators 4 can automatically re-generate or modify the Source Code 5 related to the Server Applications 30, Data Storage 35, DB module 34, Data Model 31 and API 32, each Client Application 20 DB module 24, Data Model 21, and View 22, and any changes required of serializers, parsers, Data Packets 42, or other data transport structures.

In this way, making changes to the Master Schema 1 allows a software developer to re-generate or modify code automatically and use the Schema Enforcers 6 to ensure that changes to the Source Code 5 made by the Source Code Generator 4 are in compliance. In this embodiment of the present invention, therefore, a developer can rapidly modify and test code without the expense of large software engineering and quality assurance teams.

Figure 4:
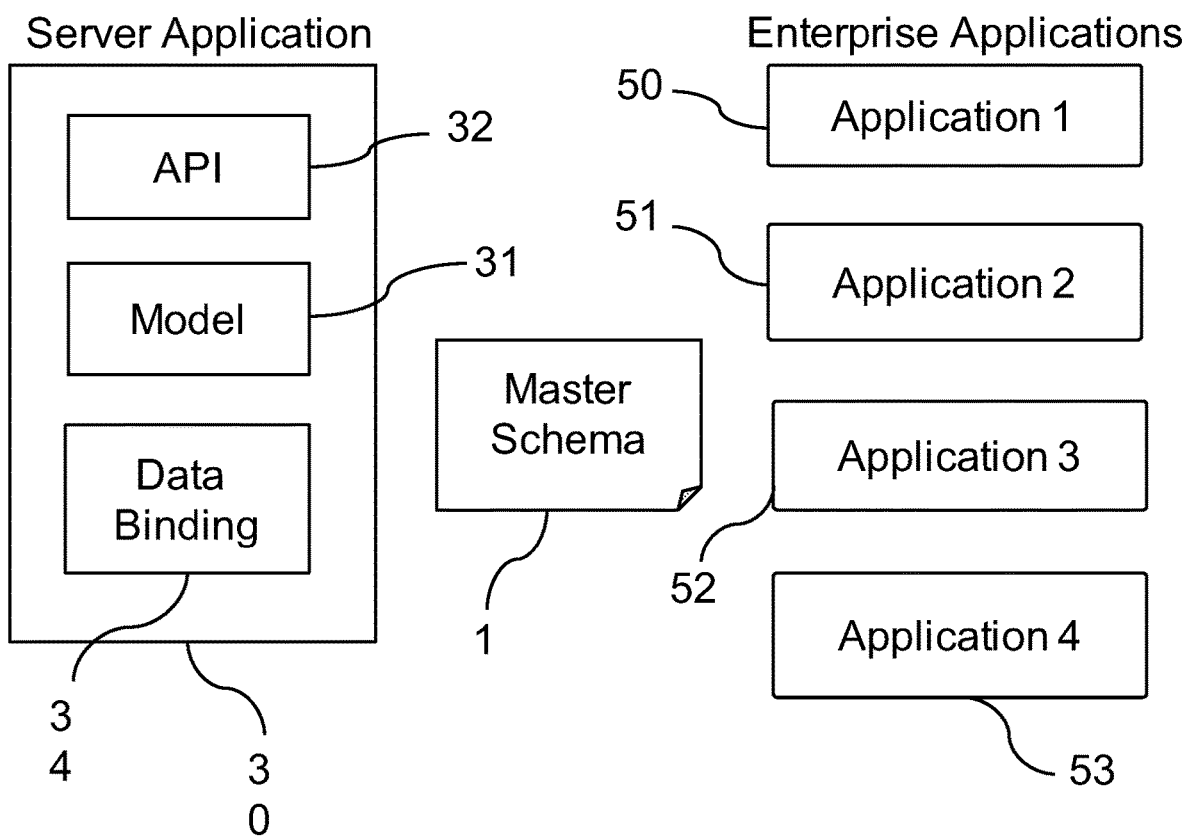
FIG. 4 shows a view of the master schema in operation.

Referring to FIG. 4, the Master Schema 1 may be derived from a plurality of Enterprise Applications 50-53. The Source Code Generator 4 as described in FIG. 1 may generate or modify the Data Model 31, API 32 and DB module 34 of such that the Server Application 30 becomes a unified interface to a plurality of enterprise applications 50-53. The Client Application 20 of FIG. 2 over a Network 40 establishes a single Network Connection 41 with the Server Application 30, and thereby eliminates the need for a resource and connection constrained wireless device such as a mobile phone or tablet from needing to establish separate communications with a plurality of enterprise applications 50-53.

As described above, the present invention comprises a computer system within which it comprises the computer program of the present invention. Without limitation, the computer system comprises a personal computer, a tablet computer, a laptop, a personal digital assistant, a mobile phone, a web appliance, and other machine capable of executing instructions that specify actions to be taken by that machine. While only a single machine is illustrated, it is contemplated that the machine operates as a standalone device or jointly as a collection of machines to execute a set of instructions to perform any one or more of the methods discussed herein.

Figure 5:
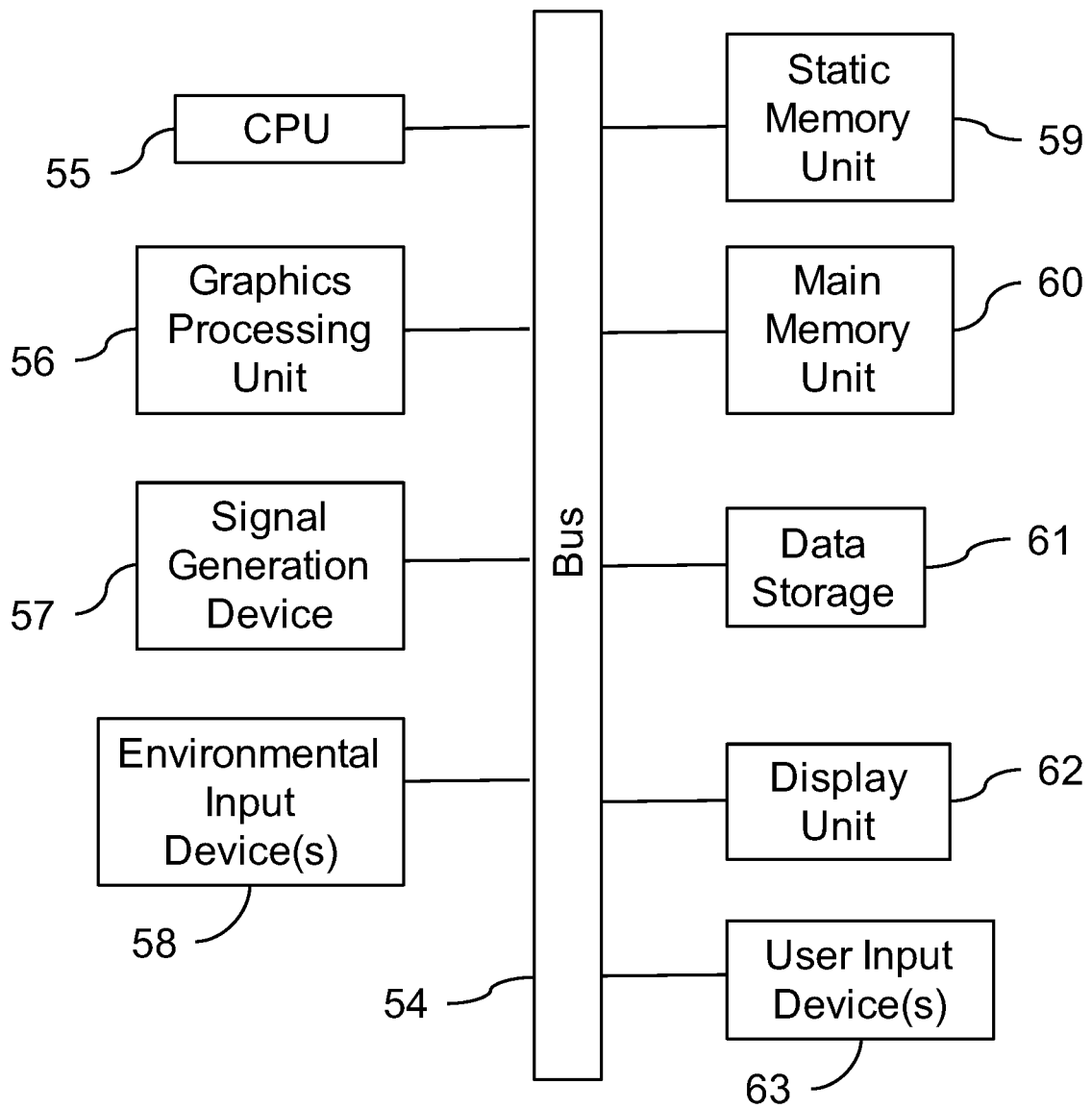
FIG. 5 shows a view of an exemplary computer system within which it comprises the components of the present invention.

Accordingly, the computer system as shown in FIG. 5 comprises a processor, e.g., a central processing unit (CPU) 55, a graphics processing unit 56, a main memory unit 60, and a static memory unit 59, wherein the foregoing components communicate with each other via a bus 54. The computer system may further comprise a display unit 62, a user input device 63, e.g., keyboard and mouse, a data storage unit 61, a signal generation device 57, e.g., speakers, a network interface device, and an environmental input device 58, e.g., Global Positioning System (GPS) receiver, sensors, camera, microphone, etc.

The data storage unit 61 includes a machine-readable medium on which is stored one or more sets of data structures and instructions, e.g., computer program, software, application, etc., embodying or utilized by any one or more of the methods or functions described herein. The instructions may also reside, completely or partially, in one or more memory units and/or within the processor during the execution thereof by the computer system, the memory units and the processor also constituting machine-readable media.

The instructions may be transmitted or received over the Network 40 using a transmission medium. More specifically, the instructions may be transmitted using the network interface device and any number of transfer protocols, e.g., HTTP. The term "transmission medium" as used herein comprises any intangible medium that is capable of storing, encoding, or carrying instructions for execution by the machine, and includes digital or analog communications signals or other intangible media to facilitate communication of such software.

As will be understood by those familiar with the art, the present subject matter may be embodied in other specific forms without departing from the spirit or essential characteristics thereof. Likewise, the particular naming and division of the portions, modules, agents, managers, components, functions, procedures, actions, layers, features, attributes, methodologies, and other aspects are not mandatory or significant, and the mechanisms that implement the present subject matter or its features may have different names, divisions, and/or formats.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A system for enforcing a data model for a distributed application in a software development, comprising:
   one or more processors; and
   a memory including a plurality of computer-executable components that are executable by the one or more processors to perform a plurality of actions, the plurality of actions comprising:
      providing a master schema to at least one schema generator;
      at least one of marking-up, annotating and instantiating the master schema, via at the least one schema generator to create at least one revised schema, and further wherein at least one revised schema is configured to define at least one class file or data object for the distributed application;
      providing at least one client application and at least one server application in a distributed application;
      providing a source code generator operable to read the revised schema to generate a generated client source code comprising at least one client class file or data object;
      compiling a client application source code with the at least one client class file or data object;
      determining whether the compiled client application source code complies with the at least one client class file or data object;
      providing a source code generator that reads the revised schema to generate a generated server source code comprising at least one client class file or data object;
      enforcing in conjunction with code generation that a server class file or a data object map to data structures of a data storage;
      transmitting at least one data set between a client class file or a data object and the server class file or the data object; and
      transmitting at least one data set between at least one server class file or data model and at least one data storage.

2. The system of claim 1 further comprising the step of deriving a master schema from one of a data source, a data structure, and a database.

3. The system of claim 1 further comprising providing at least one data storage for the server application.

4. The system of claim 1 wherein the at least one data storage is a database.

5. The system of claim 1 further comprising enforcing in conjunction with code generation that the client class file or data object matches the server class file or data object in terms of what types of data and structures of data they contain.

6. The system of claim 1 wherein the step of at least one of marking-up and instantiating the master schema creates at least one derived schema.

7. The system of claim 1 further comprising generating a database schema to configure a database.

8. The system of claim 1 wherein the revised schema is an object model schema.

9. The system of claim 1 further comprising using revised schema enforcers to compare client application source code with the client object data.

10. The system of claim 1 further comprising compiling client application source code with the client class file or data object.

11. The system of claim 9 further comprising compiling client application source code with the client class file or data object to determine if the client application source code complies with the data and data structure.

12. The system of claim 10 further comprising determining if the client application source code complies with one or more types of data and data structures readable or writable by the client application source code.

13. The system of claim 1 wherein providing the source code generator is operable for at least one client application source code to read and write data in a distributed application.

14. The system of claim 1 further comprising compiling client application source code with the client class file or data object.

15. The system of claim 14 further comprising determining if the client application source code complies with one or more types of data and data structures readable or writable by the client application source code.

16. The system of claim 1 further comprising providing a source code generator configured to generate a generated source code comprising at least one server API for at least one server application in a distributed application.

17. The system of claim 1 wherein the data object is an object data model.

18. The system of claim 1 wherein the step of transmitting at least one data set between the client class file or data object and the server class file or the data object is through a server API.

19. The system of claim 1 further comprising providing a source code generator configured to generate a generated source code comprising at least one client view.

20. The system of claim 1 wherein the distributed application is a web application or a mobile client application.

21. The system of claim 1 further comprising compiling server application code with the server class file or data object.

22. The system of claim 21 further comprising compiling a server application source code with the server class file or object data to determine if the server application source code complies with the data and data structure.

23. The system of claim 21 further comprising determining if the server application source code complies with one or more data types and data structures readable or writable by the server application source code.

24. The system of claim 1 wherein providing the source code generator is operable to read and write data in a distributed application for at least one server application.

* * * * *